US011481934B2

United States Patent
Boada et al.

(10) Patent No.: US 11,481,934 B2
(45) Date of Patent: Oct. 25, 2022

(54) SYSTEM, METHOD, AND COMPUTER-ACCESSIBLE MEDIUM FOR GENERATING MAGNETIC RESONANCE IMAGING-BASED ANATOMICALLY GUIDED POSITRON EMISSION TOMOGRAPHY RECONSTRUCTION IMAGES WITH A CONVOLUTIONAL NEURAL NETWORK

(71) Applicant: New York University, New York, NY (US)

(72) Inventors: Fernando Boada, Purchase, NY (US); David Rigie, San Francisco, CA (US)

(73) Assignee: NEW YORK UNIVERSITY, New York, NY (US)

( * ) Notice: Subject to any disclaimer, the term of this patent is extended or adjusted under 35 U.S.C. 154(b) by 268 days.

(21) Appl. No.: 16/598,704

(22) Filed: Oct. 10, 2019

(65) Prior Publication Data

US 2020/0118307 A1 Apr. 16, 2020

Related U.S. Application Data (60) Provisional application No. 62/743,905, filed on Oct. 10, 2018.

(51) Int. Cl.
*G06T 11/00* (2006.01)

(52) U.S. Cl.
CPC ....... *G06T 11/003* (2013.01); *G06T 2211/408* (2013.01)

(58) Field of Classification Search
USPC .......................... 382/128, 131, 155–156, 159
See application file for complete search history.

(56) References Cited

U.S. PATENT DOCUMENTS 9,471,978 B2 * 10/2016 Chen ...................... G16H 30/40
10,002,444 B2 * 6/2018 Knoll .................... G06T 11/003
(Continued)

OTHER PUBLICATIONS

Rigie et al., Approximating MRI-Based Anatomically guided PET Reconstruction with a Convolutional Neural Network, 2018 IEEE 978-5386-8494-8/18, pp. 1-3. (Year: 2018).*
(Continued)

*Primary Examiner* — Ishrat I Sherali
(74) *Attorney, Agent, or Firm* — Hunton Andrews Kurth LLP (57) ABSTRACT

An exemplary system, method and computer-accessible medium for generating an image(s) of a portion(s) of a patient(s) can be provided, which can include, for example, receiving first information associated with a combination of positron emission tomography (PET) information and magnetic resonance imaging (MRI) information, generating second information by applying a convolutional neural network(s) (CNN) to the first information, and generating the image(s) based on the second information. The PET information can be fluorodeoxyglucose PET information. The CNN(s) can include a plurality of convolution layers and a plurality of parametric activation functions. The parametric activation functions can include, e.g., a plurality of parametric rectified linear units. Each of the convolution layers can include, e.g., a plurality of filter kernels. The PET information can be reconstructed using a maximum likelihood estimation (MLE) procedure to generate a MLE image.

18 Claims, 5 Drawing Sheets

(56) References Cited

U.S. PATENT DOCUMENTS

| | | | | |
|---|---|---|---|---|
| 10,634,747 | B2* | 4/2020 | Majewski | A61B 6/037 |
| 10,671,939 | B2* | 6/2020 | Knoll | G06N 20/00 |
| 10,803,984 | B2* | 10/2020 | Zhou | G06T 5/50 |
| 10,943,349 | B2* | 3/2021 | Lee | G06T 11/005 |
| 11,062,486 | B2* | 7/2021 | Gao | G06N 3/08 |
| 11,080,897 | B2* | 8/2021 | Li | G06T 7/13 |
| 2009/0072156 | A1* | 3/2009 | Chinn | G01T 1/2985 250/363.04 |
| 2014/0037172 | A1* | 2/2014 | Madabhushi | G06K 9/6251 382/131 |
| 2016/0271276 | A1* | 9/2016 | Hooker | C07C 275/34 |
| 2016/0291105 | A1* | 10/2016 | Knoll | G16H 50/20 |
| 2016/0343127 | A1* | 11/2016 | Miller | A61B 6/5211 |
| 2018/0033144 | A1* | 2/2018 | Risman | G16H 30/20 |
| 2019/0130569 | A1* | 5/2019 | Liu | G06T 5/50 |
| 2019/0139205 | A1* | 5/2019 | El-Khamy | G06K 9/6857 |
| 2019/0295295 | A1* | 9/2019 | Hyun | G06N 20/00 |
| 2019/0365341 | A1* | 12/2019 | Chan | G06T 7/0012 |
| 2020/0118307 | A1* | 4/2020 | Boada | G06T 11/003 |
| 2020/0202999 | A1* | 6/2020 | Takeshima | G06N 3/0454 |
| 2020/0311914 | A1* | 10/2020 | Zaharchuk | G06N 20/10 |
| 2020/0372637 | A1* | 11/2020 | Ha | G06T 5/50 |

OTHER PUBLICATIONS

Xu et al., 200x Low dose PET Reconstruction using Deep Learning, 2017, arXiv: 1712.0419v1 [cs.CV], pp. 1-9. (Year: 2017).*

Cheng et al., CNN Based Multi-Modality Classification for AD Diagnosis, 2017 IEEE 978-1-5386-1937-7/17, pp. 1-5. (Year: 2017).*

Gonzalez et al. Initial Result of the MINDView PET Insert Inside the 3T mMR, 2018 IEEE 2469-7311, pp. 343-351. (Year: 2018).*

Punjabi et al., Neuroimaging modality fusion in Alzheimer's classification using convolutional neural networks, Plos One. 2019; 14(12): e0225759, pp. 1-9. (Year: 2019).*

Muthiah et al., Fusion of MRI and PET Images Using Deep Learning Neural Networks, 2019 IEEE 978-1-7281-2414-8/19, pp. 283-287 (Year: 2019).*

Vu et al., Multimodal learning using Convolutional Neural Network and Sparse Autoender, 2017 IEEE 978-1-5090-3015-6/17, pp. 309-312. (Year: 2017).*

Desikan, R.S. et al. "An automated labeling system for subdividing the human cerebral cortex on MRI scans into gyral based regions of interest," Neuroimage, vol. 31, No. 3, pp. 968-980, Jul. 2006.

Ehrhardt, M. et al., "PET reconstruction with an anatomical MRI prior using parallel level sets," IEEE Trans. Med. Imaging, Apr. 2016.

Fischl, B. "FreeSurfer," Neuroimage, vol. 62, No. 2, pp. 774-781, Aug. 2012.

He, K. et al., "Delving deep into rectifiers: Surpassing Human Level performance on ImageNet classification," Feb. 2015, p. 1-9.

Knoll, F. et al., "Joint MR PET reconstruction using a Multi-Channel image regularizer," IEEE Trans. Med. Imaging, vol. 36, No. 1, pp. 1-16, Jan. 2017.

Schramm, G. et al., "Evaluation of parallel level sets and bowsher's method as Segmentation-Free anatomical priors for Time-of-Flight PET reconstruction," IEEE Trans. Med. Imaging, vol. 37, No. 2, pp. 590-603, Feb. 2018.

Vunckx, K. et al., "Heuristic modification of an anatomical markov prior improves its performance," in IEEE Nuclear Science Symposuim & Medical Imaging Conference, IEEE, Oct. 2010, pp. 3262-3266.

Bowsher, J. E. et al., "Bayesian reconstruction and use of anatomical a priori information for emission tomography," IEEE Trans. Med. Imaging, vol. 15, No. 5, pp. 673-686, 1996.

Delso, G. et al., "Performance measurements of the siemens mMR integrated whole-body PET/MR scanner," J. Nucl. Med., vol. 52, No. 12, pp. 1914-1922, Dec. 2011.

* cited by examiner

SYSTEM, METHOD, AND COMPUTER-ACCESSIBLE MEDIUM FOR GENERATING MAGNETIC RESONANCE IMAGING-BASED ANATOMICALLY GUIDED POSITRON EMISSION TOMOGRAPHY RECONSTRUCTION IMAGES WITH A CONVOLUTIONAL NEURAL NETWORK

CROSS-REFERENCE TO RELATED APPLICATION(S)

This application relates to and claims priority from U.S. Patent Application No. 62/743,905, filed on Oct. 10, 2018, the entire disclosure of which is incorporated herein by reference.

STATEMENT REGARDING FEDERALLY SPONSORED RESEARCH

This invention was made with government support under Grant No. P41EB017183-04 awarded by the National Institutes of Health. The government has certain rights in the invention.

FIELD OF THE DISCLOSURE

The present disclosure relates generally to magnetic resonance imaging ("MRI"), and more specifically, to exemplary embodiments of exemplary system, method, and computer-accessible medium for generating high-resolution, magnetic resonance imaging-based anatomically guided positron emission tomography reconstruction images with a convolutional neural network.

BACKGROUND INFORMATION

Positron emission tomography ("PET") is a clinical tool that provides valuable physiological information that may not be obtained from either computed tomography ("CT") or MRI; however, compared with these imaging modalities, it suffers from several drawbacks. Due to physical and technical constraints, clinical PET images are often contaminated by a high level of Poisson noise and general purpose clinical scanners are typically limited to a spatial resolution of 4-5 millimeters. (See, e.g., Reference 1).

Generally, a CT scan or an Mill scan is almost always acquired in combination with a PET image, which has led to a variety of Bayesian reconstruction models which utilize the CT or Mill images as an anatomical prior (see, e.g., References 2-6), resulting in an improved signal-to-noise ratio ("SNR"), and higher spatial resolution. Furthermore, the recent clinical availability of integrated PET-MR systems has been beneficial since it can seamlessly provide the required anatomical constraint images without the need for additional imaging time.

One limitation to the widespread clinical adoption of these Bayesian reconstruction procedures is that they require significant additional reconstruction time. Compared with the standard model-based iterative reconstruction approaches ("MBIR") used clinically, these prior-image-guided reconstructions are typically performed on a finer voxel grid and require a greater number of iterations since they are regularized by the anatomical prior rather than by early stopping. Another problem with MBIR approaches is that they require the use of the PET raw data, which typically has a proprietary format, and generally has a much larger size than a Digital Imaging and Communications in Medicine ("DICOM")-based image.

Thus, it may be beneficial to provide an exemplary system, method, and computer-accessible medium for generating magnetic resonance imaging-based anatomically guided positron emission tomography reconstruction images with a convolutional neural network which can overcome at least some of the limitations described herein above.

SUMMARY OF EXEMPLARY EMBODIMENTS

An exemplary system, method and computer-accessible medium for generating an image(s) of a portion(s) of a patient(s) can be provided, which can include, for example, receiving first information associated with a combination of positron emission tomography (PET) information and magnetic resonance imaging (MRI) information, generating second information by applying a convolutional neural network(s) (CNN) to the first information, and generating the image(s) based on the second information. The PET information can be fluorodeoxyglucose PET information. The CNN(s) can include a plurality of convolution layers and a plurality of parametric activation functions. The parametric activation functions can include a plurality of parametric rectified linear units. Each of the convolution layers can include a plurality of filter kernels. The PET information can be reconstructed using a maximum likelihood estimation procedure to generate a MLE image.

In some exemplary embodiments of the present disclosure, the first imaging information can include the MLE image and a magnetization-prepared rapid gradient echo sequence (MPRAGE) image. The second information can be a residual image of the portion(s). The image(s) can be generated by combining the residual image with the MLE image. The MLE image and the MPRAGE image can be concatenated along a channel dimension, for example, into a single tensor. The MPRAGE image can be regridded to match a resolution of the MLE image and a Bowsher PET image. Voxel values in the MLE image can be rescaled based on a slope and an intercept. The second information can be generated by reducing a channel dimension of the first information to 1 dimension.

In certain exemplary embodiments of the present disclosure, the CNN(s) can include a plurality of hidden layers, which, for example, can be at least 7 hidden layers. Each of the at least 7 hidden layers can include at least 16 filters, and each of the at least 16 filters can be a 3×3×3 filter.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary embodiments of the system, method, and computer-accessible medium, according to an exemplary embodiment of the present disclosure, can be used to determine whether anatomically-guided PET reconstruction methods can be approximated entirely in the imaging domain with a convolutional neural network ("CNN"). An exemplary CNN was trained to transform standard clinical PET and MRI reconstructions into a high resolution PET image such as what can be obtained by performing MBIR with an MR-based anatomical prior. In particular, the exemplary system, method, and computer-accessible medium can use an asymmetric "Bowsher" prior (see, e.g., References 3 and 6), which can be applied to PET-MR data. Once trained, the exemplary CNN can be performed in only a fraction of a second to apply the learned transform, and only needs standard DICOM images as an input. Thus, the exemplary trained network can provide fast computation times, can be easy to distribute and can be applied to new datasets.

Prior implementations of CNN-based resolution improvement was based on the use of PET raw data along with anatomical prior information (e.g., MRI or CT image) to produce an improved image meeting one of both of the following conditions: (i) the image was data consistent (i.e., the raw data predicted from the improved image were as close as possible to the input raw data) and (ii) the image was as close as possible to an idealized version of the image where the effects of the data acquisition process were ideally removed (e.g., a fully sampled image used as the target output for a sub-sampled data set). In contrast, the exemplary system, method and computer-accessible medium does not need to utilize the raw data or an idealized image. The exemplary system, method and computer-accessible medium, according to an exemplary embodiment of the present disclosure, can utilize any suitable PET reconstruction (e.g., a Maximum Likelihood Estimation Method and a model-based iterative reconstruction as the idealized image may not be not known) to train an exemplary CNN to obtain a model-based iterative reconstruction-quality image in a short reconstruction time (e.g., (1-2 secondss).

Exemplary Methods
Exemplary Training Data

The exemplary system, method, and computer-accessible medium, according to an exemplary embodiment of the present disclosure, was used to analyze 49 [$^{18}$F] fluorodeoxyglucose ("FDG") PET/MR data sets acquired 40-60 min post injection on a Siemens Biograph mMR (Siemens Healthcare, Erlangen, Germany). All PET emission datasets were reconstructed using a Maximum Likelihood Estimation Method ("MLEM") reconstruction with point spread function modeling (e.g., voxel size 1×1×2 mm$^3$ 3 iterations, 21 subsets, no post-smoothing). Further, a MBIR procedure can also be used to reconstruct the PET emission datasets. A PET reconstruction with anatomical regularization using an asymmetrical Bowsher prior (e.g., same voxel size as MLEM, regularization weight β=10, relative difference prior, 4 out of 18 nearest neighbors) was performed in all cases. (See, e.g., Reference 3). The anatomical information was taken from a T1-weighted image produced by a 3-dimensional magnetization-prepared rapid gradient echo sequence (e.g., MPRAGE; repetition, inversion, and echo times=2400, 900, and 2.75 ms, respectively; 1×1×1 mm resolution). All MPRAGE MR images were coregistered to the MLEM PET reconstructions to compensate for motion-induced mismatches. The first 20 datasets were used for training, while the remaining 29 were reserved for testing.

Exemplary Data Preprocessing

Prior to training, several exemplary preprocessing procedures were performed on the input images. The MPRAGE images were regridded to match the orientation and resolution of the MLEM and Bowsher PET images. The voxel values of the MLEM and Bowsher training images were rescaled by slope aPET and intercept β$_{PET}$, where α$_{PET}$ and β$_{PET}$ were chosen so that the MLEM images were within the range [0, 1]. Similarly, MPRAGE images were rescaled between [0, 1] by α$_{MR}$ and β$_{MR}$. Finally, the normalized MLEM and MPRAGE image volumes were concatenated into a single tensor, which was used as the input to the CNN.

Exemplary CNN Architecture and Training

Figure 1:
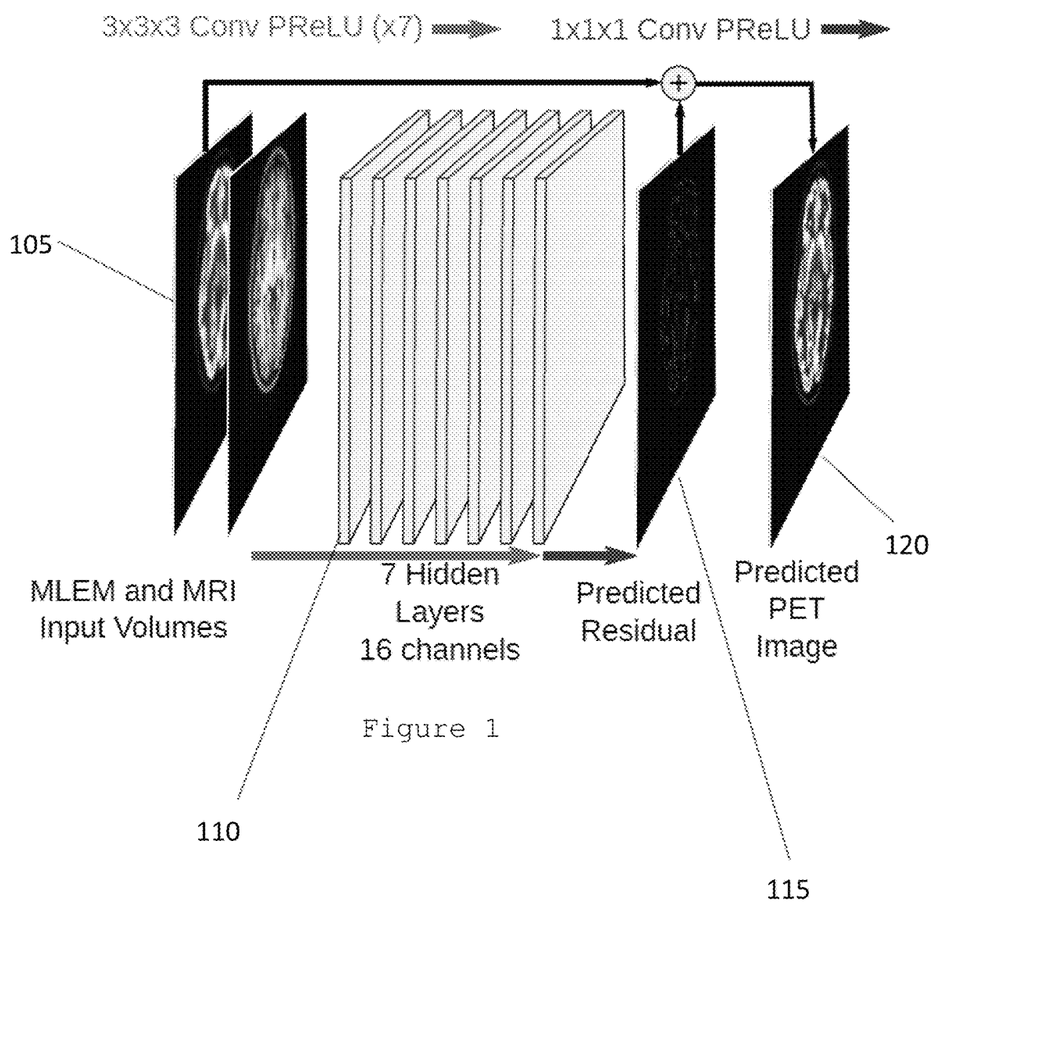
FIG. 1 is an exemplary diagram of positron emission tomography images and magnetic resonance imaging images concatenated along a channel dimension according to an exemplary embodiment of the present disclosure.

FIG. 1 is an exemplary diagram of positron emission tomography images and magnetic resonance imaging images concatenated along a channel dimension using the exemplary CNN according to an exemplary embodiment of the present disclosure. The exemplary CNN architecture included multiple convolution layers and parametric activation functions (e.g., parametric rectified linear units ("PReLU")) (see, e.g., Reference 7), as shown in FIG. 1. MLEM (e.g., PET) and MPRAGE (e.g., MRI) image volumes 105 were concatenated along the channel dimension into a single tensor, which was used as input to the exemplary CNN. Each of the hidden layers 110 (e.g., 7 hidden layers as shown in FIG. 1) included 16 3×3×3 filters followed by a PReLU nonlinearity, which adds 16 additional parameters per layer. The final layer 115 performed a 1×1×1 convolution+PReLU nonlinearity, which was used reduce the channel dimension to one. This yielded the residual between the MLEM image and the target Bowsher image. This residual was added to the MLEM image to obtain the final estimated PET image 120. All filter kernels were initialized with Gaussian random weights with zero mean and a variable standard deviation. (See, e.g., Reference 7).

The residual between the gold standard Bowsher PET image and the MLEM PET image can be used as the training target, with a mean-squared-error ("MSE") cost function. Thus the MLEM image can be added to the network output to obtain the final estimated PET image. The exemplary network was trained on the first 20 patient datasets for 5000 epochs using the Adam optimizer. Finally, all datasets were processed using the trained network. Due to GPU memory constraints, only the middle 50 slices of each dataset were used during training, but the full image volumes (e.g., 127 slices) were used during test.

Exemplary Results
Exemplary Qualitative Comparison

Figure 2:
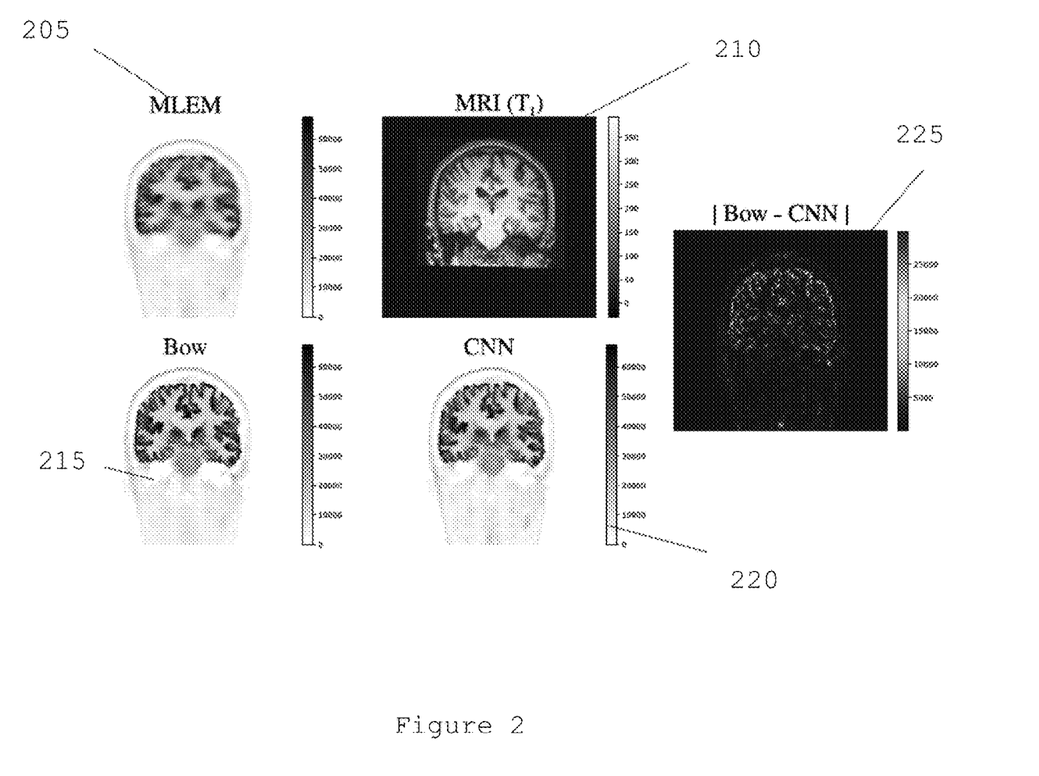
FIG. 2 is an exemplary set of coronal slices images showing inputs into the exemplary convolutional neural network and the resulting predicted images according to an exemplary embodiment of the present disclosure.

FIG. 2 shows a set of diagrams of sample coronal slices of both the inputs to the CNN (e.g., inputs 205 and 210) as well as the ground truth Bowsher reconstruction (e.g., image 215) and the image predicted by the CNN (e.g., image 220). Additionally, the absolute differences between the true Bowsher image and the CNN image are illustrated in an image 225. Qualitatively, the CNN produced images that very similar to the MBIR method with asymmetric Bowsher prior.

Exemplary ROI-Based Assessment

A regional quantification between the gold standard Bowsher images and those produced by the CNN was compared in different anatomical ROIs in 49 subjects. The regions were defined based on a FreeSurfer (see, e.g., Reference 8), segmentation, and parcellation of the MPRAGE images using 113 ROIs of the Desikan-Killiany Atlas. (See, e.g., Reference 9). In each ROI, the ratio of the mean uptake (e.g., relative mean) between the CNN Bowsher and the gold standard Bowsher was calculated.

Figure 3:
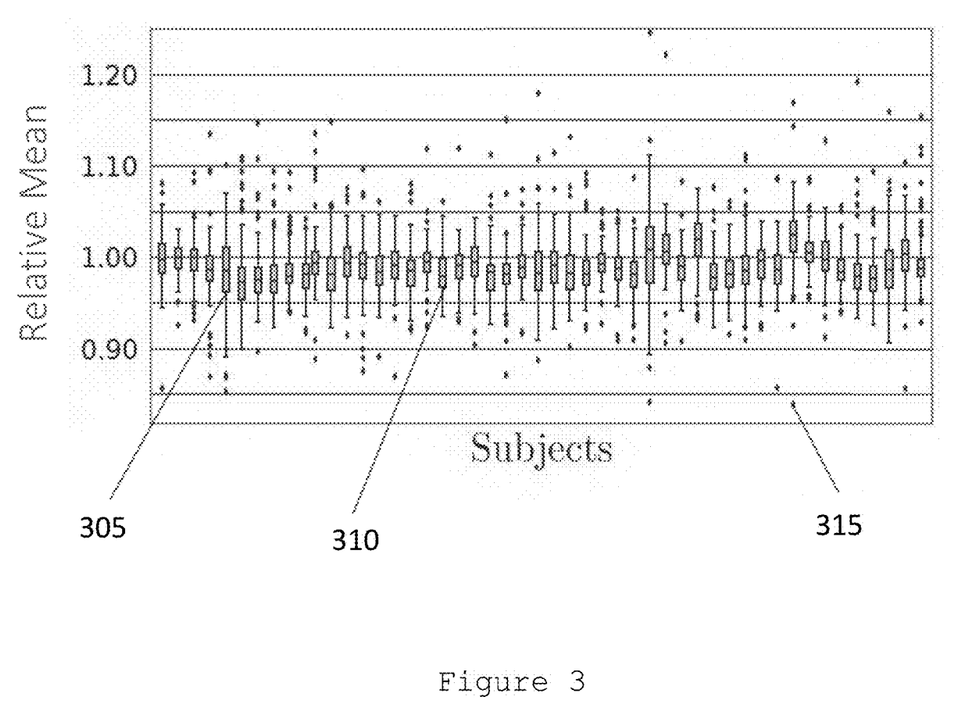
FIG. 3 is an exemplary graph illustrating the regional analysis across 49 subjects.

The exemplary graph shown in FIG. 3 provides the regional analysis across 49 subjects. Boxes 305 represent data that was part of the training set, while boxes 310 correspond to data seen by the network during test. For each subject, the distribution of the relative mean taken over all ROIs is shown. The boxes represent the interquartile range and the whiskers show the complete data range corrected for outliers (e.g., element 315).

Exemplary Discussion

An image domain CNN can accurately approximate a model-based iterative reconstruction with the asymmetric Bowsher prior. The images produced by the CNN were both qualitatively and quantitatively very similar to the Bowsher images; however, applying the trained CNN to new datasets takes only a fraction of a second and requires only standard DICOM images as input. Therefore, the exemplary system method, and computer-accessible medium can be particularly suitable for clinical scenarios where the additional reconstruction time for the MBIR with Bowsher prior can be prohibitive. Furthermore, due to the extremely low computational overhead, the exemplary CNN post processing can be incorporated into a visualization program and toggled on or off nearly in real time.

The exemplary system, method, and computer-accessible medium, according to an exemplary embodiment of the present disclosure, can also be used on training dataset to include a variety of different noise levels and anatomy as well as PET images produced by different scanners and vendors. Furthermore, the exemplary CNN can also learn other anatomical priors, such as parallel level sets (see, e.g., Reference 4), and multi-channel total variation, although not limited thereto. (See, e.g., Reference 5).

Figure 4:
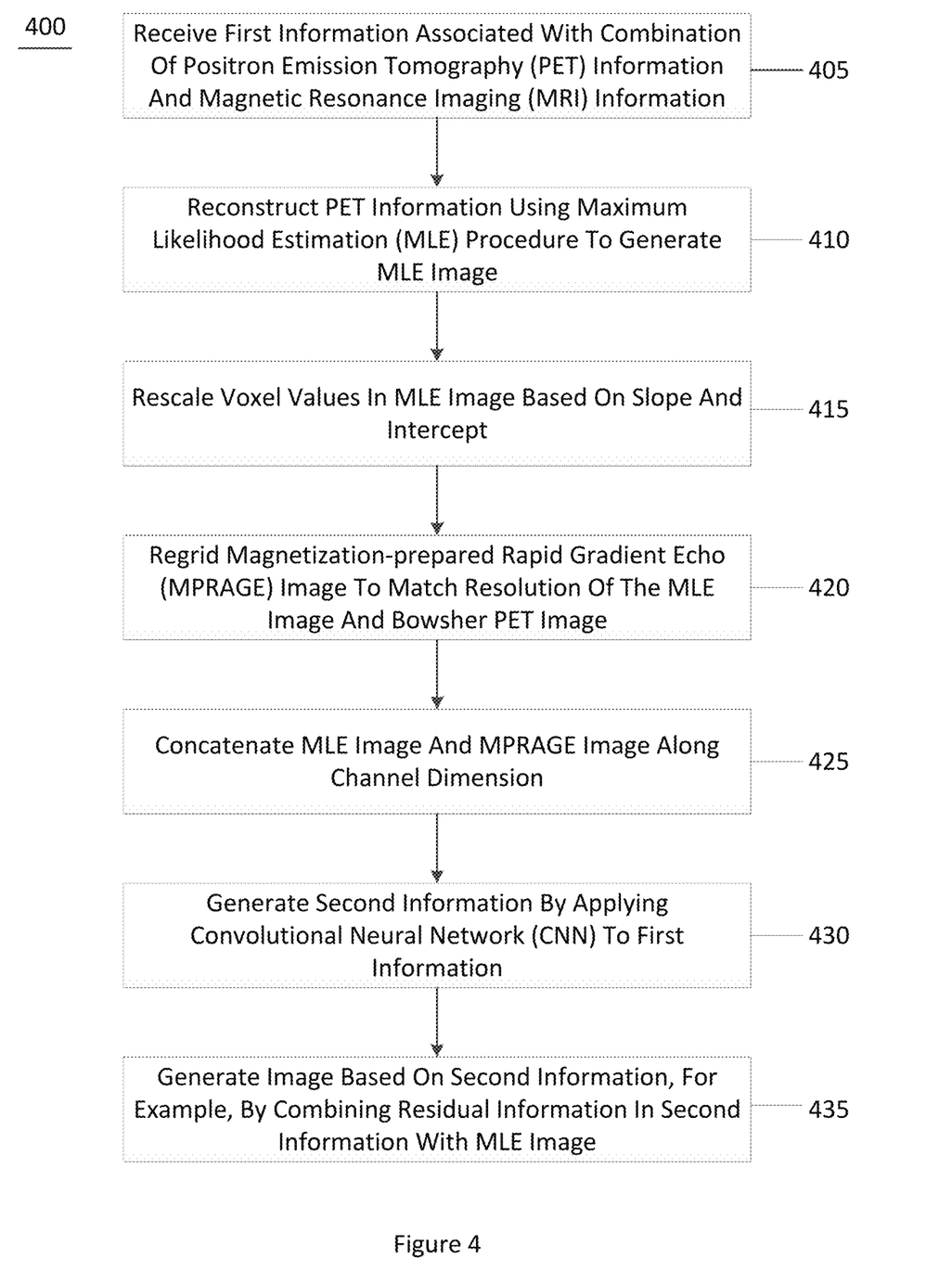
FIG. 4 is a flow diagram of an exemplary method for generating an image of a portion of a patient according to an exemplary embodiment of the present disclosure.

FIG. 4 shows a flow diagram of an exemplary method for generating an image of a portion of a patient according to an exemplary embodiment of the present disclosure. For example, at procedure 405, first information associated with a combination of PET information and MII information can be received. At procedure 410, the PET information can be reconstructed using a MLE procedure to generate a MLE image. At procedure 415, voxel values in the MLE image can be rescaled based on a slope and an intercept. At procedure 420, a magnetization-prepared rapid gradient echo (MPRAGE) image can be regridded to match a resolution of the MLE image and a Bowsher PET image. At procedure 425, the MLE image and the MPRAGE image can be concatenated along a channel dimension. At procedure 430, second information can be generated by applying a CNN to the first information, which can include the concatenated MLE image the MPRAGE image. At procedure 435, the image can be generated based on the second information, for example, by combining a residual information in the second information with the MLE image.

Figure 5:
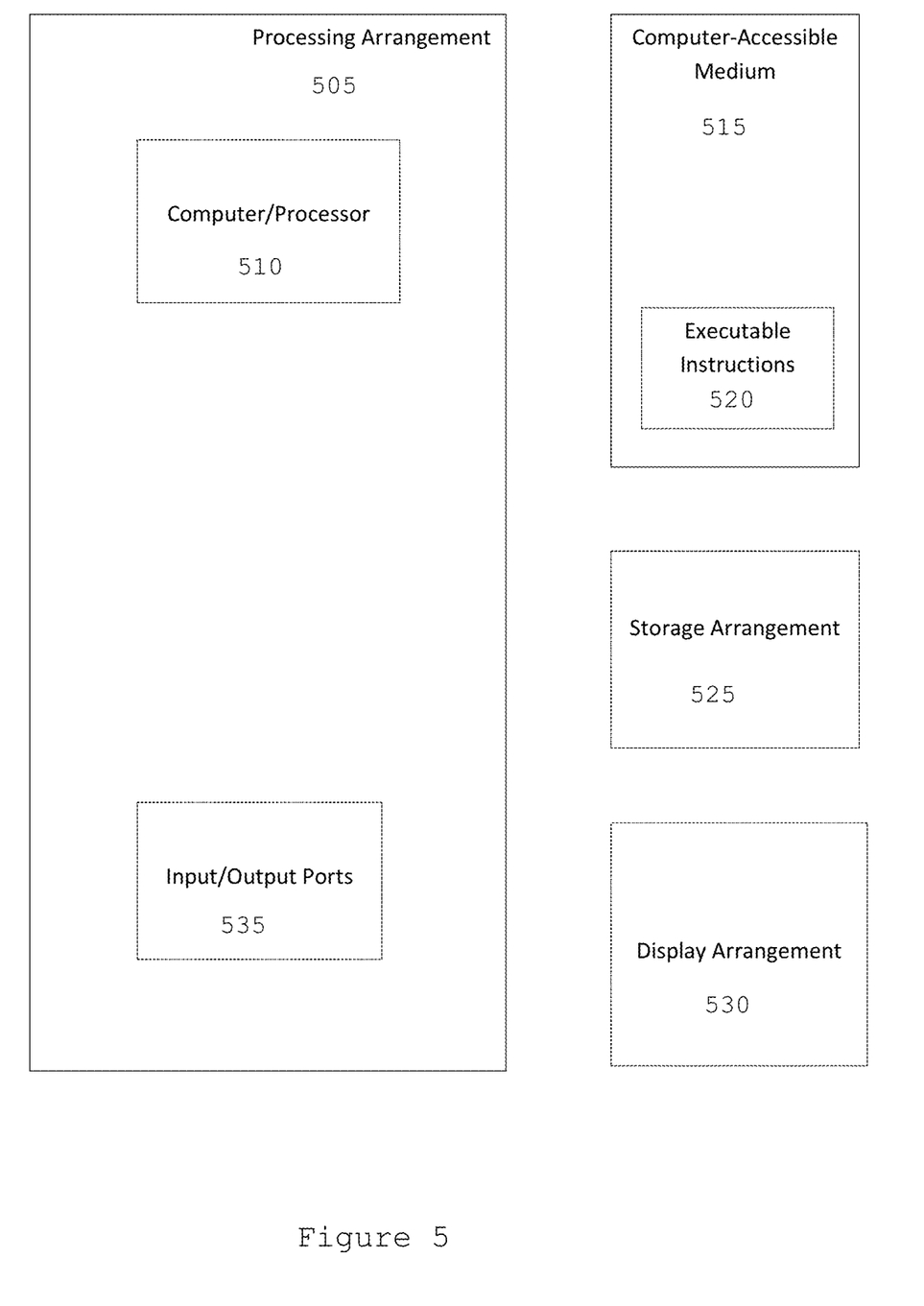
FIG. 5 is an illustration of an exemplary block diagram of an exemplary system in accordance with certain exemplary embodiments of the present disclosure.

FIG. 5 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 505. Such processing/computing arrangement 505 can be, for example entirely or a part of, or include, but not limited to, a computer/processor 510 that can include, for example one or more microprocessors, and use instructions stored on a computer-accessible medium (e.g., RAM, ROM, hard drive, or other storage device).

As shown in FIG. 5, for example a computer-accessible medium 515 (e.g., as described herein above, a storage device such as a hard disk, floppy disk, memory stick, CD-ROM, RAM, ROM, etc., or a collection thereof) can be provided (e.g., in communication with the processing arrangement 505). The computer-accessible medium 515 can contain executable instructions 520 thereon. In addition or alternatively, a storage arrangement 525 can be provided separately from the computer-accessible medium 515, which can provide the instructions to the processing arrangement 505 so as to configure the processing arrangement to execute certain exemplary procedures, processes, and methods, as described herein above, for example.

Further, the exemplary processing arrangement 505 can be provided with or include an input/output ports 535, which can include, for example a wired network, a wireless network, the internet, an intranet, a data collection probe, a sensor, etc. As shown in FIG. 5, the exemplary processing arrangement 505 can be in communication with an exemplary display arrangement 530, which, according to certain exemplary embodiments of the present disclosure, can be a touch-screen configured for inputting information to the processing arrangement in addition to outputting information from the processing arrangement, for example. Further, the exemplary display arrangement 530 and/or a storage arrangement 525 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.
[1] G. Delso, S. Furst, B. Jakoby, R. Ladebeck, C. Ganter, S. G. Nekolla, M. Schwaiger, and S. I. Ziegler, "Performance measurements of the siemens mMR integrated whole-body PET/MR scanner," J. Nucl. Med., vol. 52, no. 12, pp. 1914-1922, December 2011.
[2] J. E. Bowsher, V. E. Johnson, T. G. Turkington, R. J. Jaszczak, C. R. Floyd, and R. E. Coleman, "Bayesian reconstruction and use of anatomical a priori information for emission tomography," IEEE Trans. Med. Imaging, vol. 15, no. 5, pp. 673-686, 1996.
[3] K. Vunckx and J. Nuyts, "Heuristic modification of an anatomical markov prior improves its performance," in IEEE Nuclear Science Symposuim & Medical Imaging Conference. IEEE, October 2010, pp. 3262-3266.
[4] M. Ehrhardt, P. Markiewicz, M. Liljeroth, A. Barnes, V. Kolehmainen, J. Duncan, L. Pizarro, D. Atkinson, B. Hutton, and S. Ourselin, "PET reconstruction with an anatomical MRI prior using parallel level sets," IEEE Trans. Med. Imaging, April 2016.
[5] F. Knoll, M. Holler, T. Koesters, R. Otazo, K. Bredies, and D. K. Sodickson, "Joint MR PET reconstruction using a Multi-Channel image regularizer," IEEE Trans. Med. Imaging, vol. 36, no. 1, pp. 1-16, January 2017.
[6] G. Schramm, M. Holler, A. Rezaei, K. Vunckx, F. Knoll, K. Bredies, F. Boada, and J. Nuyts, "Evaluation of parallel level sets and bowsher's method as Segmentation-Free anatomical priors for Time-of-Flight PET reconstruction," IEEE Trans. Med. Imaging, vol. 37, no. 2, pp. 590-603, Feburary 2018.
[7] K. He, X. Zhang, S. Ren, and J. Sun, "Delving deep into rectifiers: Surpassing Human Level performance on ImageNet classification," Feburary 2015.
[8] B. Fischl, "FreeSurfer," Neuroimage, vol. 62, no. 2, pp. 774-781, August 2012.
[9] R. S. Desikan, F. Ségonne, B. Fischl, B. T. Quinn, B. C. Dickerson, D. Blacker, R. L. Buckner, A. M. Dale, R. P. Maguire, B. T. Hyman, M. S. Albert, and R. J. Killiany, "An automated labeling system for subdividing the human cerebral cortex on MRI scans into gyral based regions of interest," Neuroimage, vol. 31, no. 3, pp. 968-980, July 2006.

What is claimed is:

1. A non-transitory computer-accessible medium having stored thereon computer-executable instructions for generating at least one image of at least one portion of at least one patient, wherein, when a computer arrangement executes the instructions, the computer arrangement is configured to perform procedures comprising:
  receiving first information associated with a combination of positron emission tomography (PET) information and magnetic resonance imaging (MRI) information;
  generating second information by applying at least one convolutional neural network (CNN) to the first information;
  generating the at least one image based on the second information; and
  reconstructing the PET information using a maximum likelihood estimation (MLE) procedure to generate a MLE image,
wherein the first imaging information includes the MLE image and a magnetization-prepared rapid gradient echo sequence (MPRAGE) image.

2. The computer-accessible medium of claim 1, wherein the PET information is fluorodeoxyglucose PET information.

3. The computer-accessible medium of claim 1, wherein the at least one CNN includes a plurality of convolution layers and a plurality of parametric activation functions.

4. The computer-accessible medium of claim 3, wherein the parametric activation functions are parametric rectified linear units.

5. The computer-accessible medium of claim 3, wherein each of the convolution layers includes a plurality of filter kernels.

6. The computer-accessible medium of claim 1, wherein the second information is a residual image of the at least one portion.

7. The computer-accessible medium of claim 6, wherein the computer arrangement is configured to generate the at least one image by combining the residual image with the MLE image.

8. The computer-accessible medium of claim 1, wherein the computer arrangement is further configured to concatenate the MLE image and the MPRAGE image along a channel dimension.

9. The computer-accessible medium of claim 8, wherein the computer arrangement is configured to concatenate the MLE image and the MPRAGE image into a single tensor.

10. The computer-accessible medium of claim 1, wherein the computer arrangement is further configured to regrid the MPRAGE image to match a resolution of the MLE image and a Bowsher PET image.

11. The computer-accessible medium of claim 1, wherein the computer arrangement is further configured to rescale voxel values in the MLE image based on a slope and an intercept.

12. The computer-accessible medium of claim 1, wherein the computer arrangement is configured to generate the second information by reducing a channel dimension of the first information to 1 dimension.

13. The computer-accessible medium of claim 1, wherein the at least one CNN includes a plurality of hidden layers.

14. The computer-accessible medium of claim 13, wherein the at least one CNN includes at least 7 hidden layers.

15. The computer-accessible medium of claim 14, wherein each of the at least 7 hidden layers includes at least 16 filters.

16. The computer-accessible medium of claim 15, wherein each of the at least 16 filters is a 3×3×3 filter.

17. A method for generating at least one image of at least one portion of at least one patient, comprising:
  receiving first information associated with a combination of positron emission tomography (PET) information and magnetic resonance imaging (MRI) information;
  generating second information by applying at least one convolutional neural network (CNN) to the first information;
  using a computer hardware arrangement, generating the at least one image based on the second information; and
  reconstructing the PET information using a maximum likelihood estimation (MLE) procedure to generate a MLE image, wherein the first imaging information includes a magnetization-prepared rapid gradient echo sequence (MPRAGE) image.

18. A system for generating at least one image of at least one portion of at least one patient, comprising:
   a computer hardware arrangement configured to:
      receive first information associated with a combination of positron emission tomography (PET) information and magnetic resonance imaging (MRI) information;
      generate second information by applying at least one convolutional neural network (CNN) to the first information;
      generate the at least one image based on the second information; and
      reconstructing the PET information using a maximum likelihood estimation (MLE) procedure to generate a MLE image, wherein the first imaging information includes a magnetization-prepared rapid gradient echo sequence (MPRAGE) image.

* * * * *